(12) United States Patent
Oishi

(10) Patent No.: US 10,142,604 B2
(45) Date of Patent: Nov. 27, 2018

(54) IMAGING APPARATUS AND CONTROL METHOD THEREOF

(71) Applicant: CANON KABUSHIKI KAISHA, Tokyo (JP)

(72) Inventor: Akihiro Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/657,410

(22) Filed: Jul. 24, 2017

(65) Prior Publication Data
US 2018/0035091 A1 Feb. 1, 2018

(30) Foreign Application Priority Data

Jul. 27, 2016 (JP) ................. 2016-147777

(51) Int. Cl.
| | |
|---|---|
| H04N 9/73 | (2006.01) |
| G06K 9/36 | (2006.01) |
| H04N 5/232 | (2006.01) |
| H04N 5/77 | (2006.01) |
| H04N 9/804 | (2006.01) |
| H04N 9/82 | (2006.01) |
| G06T 9/00 | (2006.01) |
| H04N 9/04 | (2006.01) |

(52) U.S. Cl.
CPC ............ *H04N 9/735* (2013.01); *G06K 9/36* (2013.01); *G06T 9/007* (2013.01); *H04N 5/23229* (2013.01); *H04N 5/772* (2013.01); *H04N 9/8042* (2013.01); *H04N 9/8205* (2013.01); *G06T 2207/20064* (2013.01); *H04N 9/045* (2013.01)

(58) Field of Classification Search
None
See application file for complete search history.

(56) References Cited

U.S. PATENT DOCUMENTS

| | | | |
|---|---|---|---|
| 2010/0017200 A1* | 1/2010 | Oshikiri | G10L 19/005 704/207 |
| 2011/0050934 A1* | 3/2011 | Mitsunaga | H04N 1/58 348/222.1 |

(Continued)

FOREIGN PATENT DOCUMENTS

JP 2000-152240 A 5/2000

*Primary Examiner* — Eileen M Adams
(74) *Attorney, Agent, or Firm* — Cowan, Liebowitz & Latman, P.C.

(57) ABSTRACT

This invention performs encoding with high encoding efficiency while suppressing image quality degradation when RAW image data obtained by imaging is to be encoded. Hence, an imaging apparatus that encodes an image captured by an image sensor includes a plane converting unit configured to convert RAW image data of a Bayer array obtained by the image sensor into a plurality of planes each comprised of a pixel of a single component, a frequency transforming unit configured to generate a plurality of subbands by frequency-transforming each of the obtained planes, a non-linear converting unit configured to non-linearly convert coefficient data forming each of the subbands based on camera information related to imaging in the imaging apparatus, and an encoding unit configured to encode by quantizing the coefficient data obtained by the non-linear conversion by the non-linear converting unit.

10 Claims, 8 Drawing Sheets

(56) References Cited

U.S. PATENT DOCUMENTS

2011/0222767 A1* 9/2011 Mitsunaga ............ H04N 1/6027
  382/169
2016/0328848 A1* 11/2016 Andre .................... G06T 7/0012

* cited by examiner

|         | a   | b   | c   | d  | e   |
|---------|-----|-----|-----|----|-----|
| OPTIMAL | 188 | 0.1 | -3  | 1  | 0.5 |
| UNDER   | 127 | 0.3 | -12 | 25 | 0.5 |

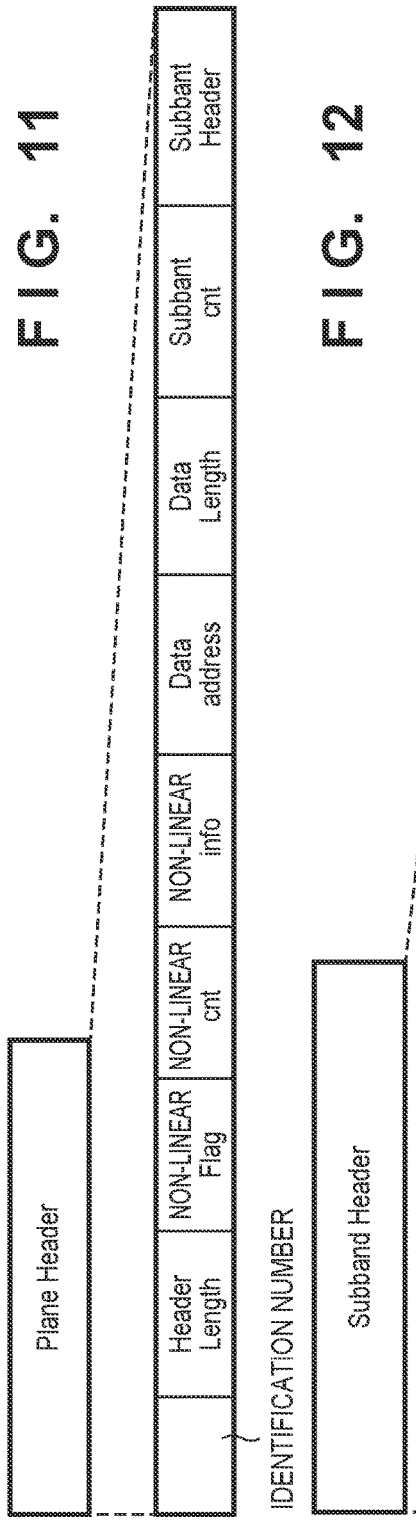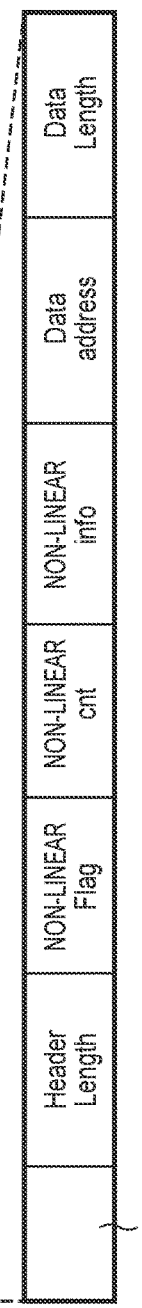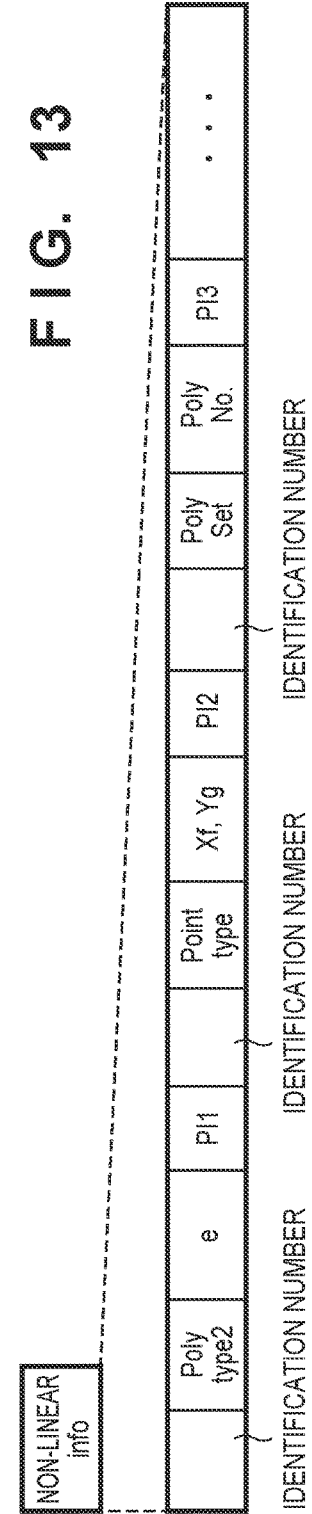

IMAGING APPARATUS AND CONTROL METHOD THEREOF

BACKGROUND OF THE INVENTION

Field of the Invention

The present invention relates to an imaging apparatus and more particularly a technique of handling a RAW image of a still image or a moving image.

Description of the Related Art

In an imaging apparatus, raw image information (RAW image) captured by an image sensor undergoes a debayer process (demosaicing process) and is converted into signals formed of luminance and color differences, and a so-called developing process such as noise removal, optical distortion correction, optimization of an image, and the like is performed on each signal. Then, the imaging apparatus compression-encodes the luminance and color difference signals that have been developed and records the resultant signal in a storage medium.

On the other hand, there exists an imaging apparatus that can record a RAW image. The RAW image of such an apparatus is advantageous in that correction and degradation of an original image obtained immediately after an imaging operation by the image sensor are suppressed to a minimum and that editing is possible after shooting. Hence, advanced users favor using the RAW image. However, since the RAW image contains an enormous amount of data, it is desirable to suppress the data amount so that as many images as possible are recorded in a storage medium which has limited space. Hence, the data amount is suppressed by compressing the RAW image. However, depending on the shooting condition, image quality degradation may occur due to compression.

Japanese Patent Laid-Open No. 2000-152240 discloses an arrangement in which quantization is changed in accordance with the characteristics of the human visual system in order to suppress image quality degradation. However, in the technique disclosed in Japanese Patent Laid-Open No. 2000-152240, if a RAW image whose data changes depending on the shooting condition is used, performing the developing process will change the luminance, the contrast, and the like that were recorded in the image data at the time of encoding. Therefore, using the image data at the time of encoding, which was recorded before the developing process, can cause image quality degradation even if optimal quantization is performed in accordance with the characteristics of the human visual system.

SUMMARY OF THE INVENTION

The present invention has been provided in consideration of the above problems and provides a technique of encoding with high encoding efficiency while suppressing image quality degradation when encoding RAW image data obtained by imaging.

According to an aspect of the invention, there is provided an imaging apparatus that encodes an image captured by an image sensor, comprising: a plane converting unit configured to convert RAW image data of a Bayer array obtained by the image sensor into a plurality of planes each comprised of a pixel of a single component; a frequency transforming unit configured to generate a plurality of subbands by frequency-transforming each of the obtained planes; a non-linear converting unit configured to non-linearly convert coefficient data forming each of the subbands based on camera information related to imaging in the imaging apparatus; and an encoding unit configured to encode by quantizing the coefficient data obtained by the non-linear conversion by the non-linear converting unit, wherein the non-linear converting unit non-linearly converts coefficient data so as to suppress the loss of coefficient data after quantization for coefficient data indicating a dark portion.

According to the present invention, encoding with high encoding efficiency is possible while suppressing image quality degradation when encoding RAW image data obtained by imaging.

Further features of the present invention will become apparent from the following description of exemplary embodiments (with reference to the attached drawings).

BRIEF DESCRIPTION OF THE DRAWINGS

FIG. 11 is a view showing the data structure of a plane header portion used in the second embodiment;

FIG. 12 is a view showing the data structure of a subband portion used in the second embodiment;

FIG. 13 is a view showing the data structure of non-linear information used in the third embodiment.

DESCRIPTION OF THE EMBODIMENTS

Embodiments according to the present invention will be described in detail below with reference to the attached drawings. Note that, in the following description, an example applicable to an imaging apparatus represented by a video camera will be described below. However, it is also applicable to an electronic device (for example, a portable phone or the like) having an imaging function. It is to be understood that the following embodiments are merely examples of the present invention.

[First Embodiment]

Figure 1:
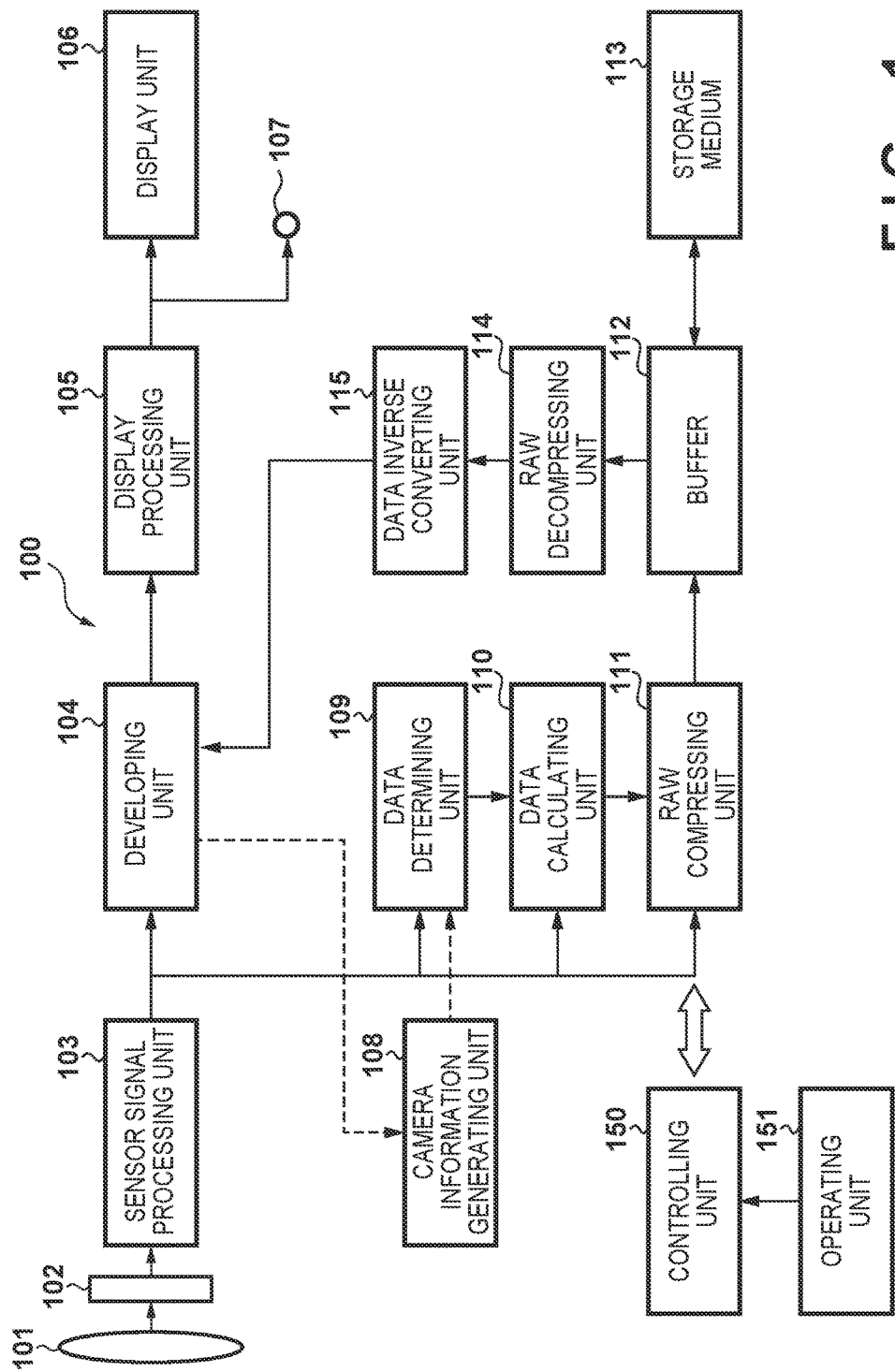
FIG. 1 is a block diagram showing the arrangement of an imaging apparatus according to the first embodiment.

FIG. 1 is a block diagram showing an example of the arrangement of an imaging apparatus 100 according to the first embodiment. In FIG. 1, a controlling unit 150 controls the overall apparatus and includes a CPU, a ROM storing programs to be executed by the CPU, and a RAM which is used as a work area. This controlling unit 150 is connected to an operating unit 151 that accepts instruction inputs from a user.

In the arrangement shown in FIG. 1, when the user inputs a shooting instruction via the operating unit 151, an optical image of an object serving as an imaging target is formed on an image sensor unit 102 via an optical system 101 under the control of the controlling unit 150. The image sensor unit 102 generates electrical signals representing the intensity of light transmitted through red, green, and blue (RGB) color filters arrayed on corresponding pixels.

Figure 2:
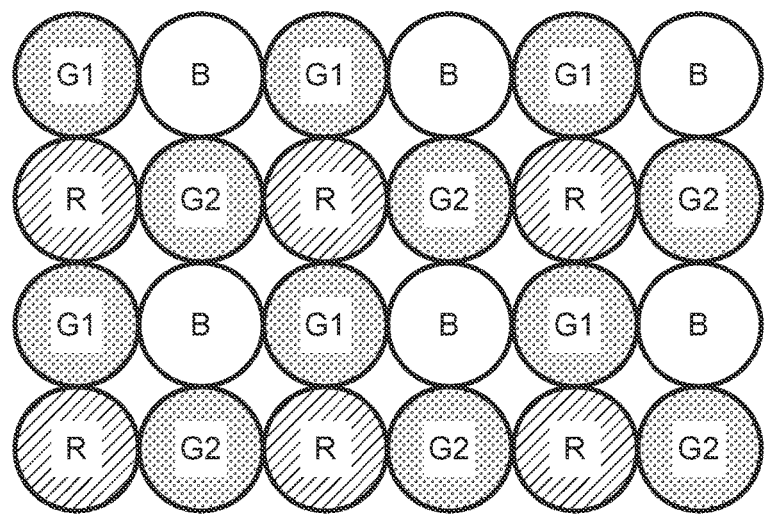
FIG. 2 is a view for explaining a Bayer array.

FIG. 2 is an example of the color filters arranged on the image sensor unit 102 and represents the pixel array of pixels handled by the imaging apparatus 100. As shown in FIG. 2, red (R), green (G), and blue (B) are arranged on corresponding pixels in a mosaic manner. When attention is paid to four pixels of a 2×2 pixel matrix in this array, it can be seen that the four pixels are comprised of one red pixel, one blue pixel, and two green pixels. This 2×2 pixel matrix is regarded as a single set, and the image sensor unit has a structure in which these sets are periodically arrayed. This kind of a pixel array is generally called a Bayer array.

The electrical signals generated by the image sensor unit 102 are A/D-converted into digital image data by a sensor signal processing unit 103 and undergoes a pixel restoring process. A restoring process includes a process of interpolating pixels as restoration targets by using neighboring pixel values and a process of subtracting predetermined offset values with respect to missing pixels or the values of low-reliability pixels in the image sensor unit 102. In this embodiment, image data which is output maintaining the form of a Bayer array from the sensor signal processing unit 103 will be referred to as a RAW image denoting a raw (undeveloped) image.

A developing unit 104 performs a developing process on RAW image data. More specifically, developing unit 104 performs a debayer process (also called a demosaicing process) on the RAW image data, performs white-balance adjustment, and converts the data into a signal in which one pixel is formed by one luminance component and two color-difference components. The developing unit 104 also removes noise included in each color component signal, corrects optical distortion, performs image optimization, and the like.

The image data obtained from the developing process performed by the developing unit 104 is displayed on a display unit 106 via a display processing unit 105. The developed image data may also be output to a display device connected to the outside via an image output terminal 107. The image output terminal 107 includes, for example, a general-purpose interface such as an HDMI® or an SDI.

Additionally, the RAW image data is also supplied to a data determining unit 109, a data calculating unit 110, and a RAW compressing unit 111.

The data determining unit 109 analyzes camera information input from a camera information generating unit 108 and the RAW image data that has been input and calculates (to be described in detail later) parameters necessary for a compressing process by the data calculating unit 110 and RAW compressing unit 111.

The data calculating unit 110 extracts (or separates) four planes, each formed from a single component, from the RAW image data input from the sensor signal processing unit 103. Referring to FIG. 2, these four planes are comprised of an R plane having an R component as its pixel value, a B plane having a B component as the pixel value, a G1 plane having a G1 component as the pixel value, and a G2 plane having a G2 component as the pixel value. The data calculating unit 110 performs wavelet transform (a type of frequency transform) on each plane, thereby generating a plurality of subbands. Note that each subband will include a plurality of pieces of coefficient data. Then, the data calculating unit 110 transforms the coefficient data of each subband by using the parameters calculated in the data determining unit 109. This transform will be further described in detail hereinafter.

Figure 3:
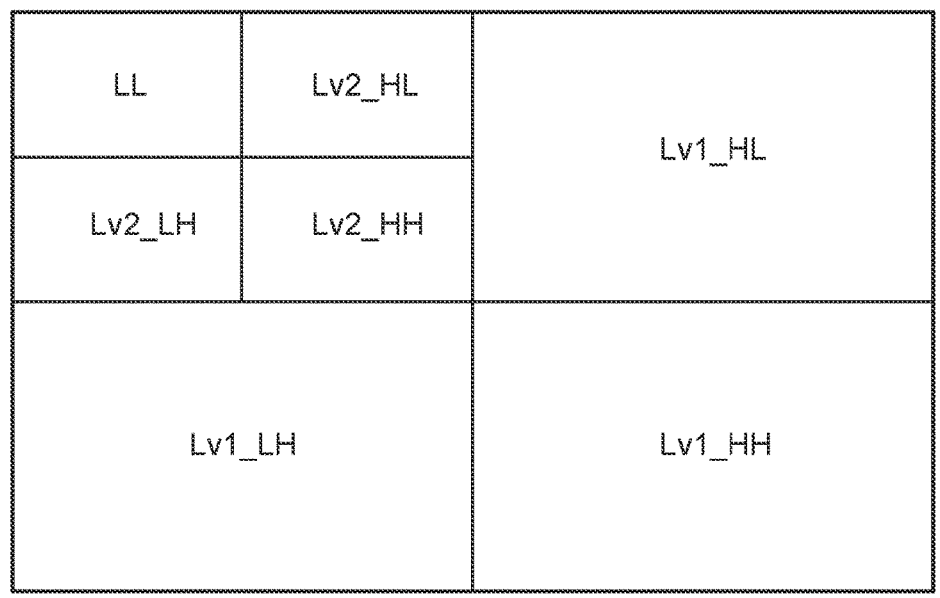
FIG. 3 is a view showing subbands generated by wavelet transform.

Human vision is insensitive to high-frequency components. Hence, it is possible to increase the compression ratio by reducing the information amount of high-frequency components of an image. Therefore, an image is decomposed into high-frequency components and low-frequency components by wavelet transform, and information of each higher frequency component is encoded at a high compression ratio. FIG. 3 is a hierarchical structural view of subbands obtained when each of vertical and horizontal filtering processes of wavelet transform has been performed twice. In FIG. 3, "Lv1" represents decomposition level 1, and "Lv2" represents decomposition level 2. Since Lv1_HL, LV1_LH, and Lv1_HH are high-frequency component subbands of decomposition level 1, these pieces of level 1 information are reduced by quantization or the like. However, even for data within Lv1, components close to lower-frequency components will have a large quantization error due to quantization. If the quantization error of a visually perceivable portion is large, image quality degradation will occur. As this will occur in each location having a small wavelet coefficient in Lv1, it is preferable for visually perceivable coefficient values to be finely quantized. Then, the higher-frequency component coefficients are coarsely quantized. Hence, the data calculating unit 110 according to this embodiment performs, before the quantization, non-linear conversion on the coefficient data obtained by wavelet transform.

Figure 4:
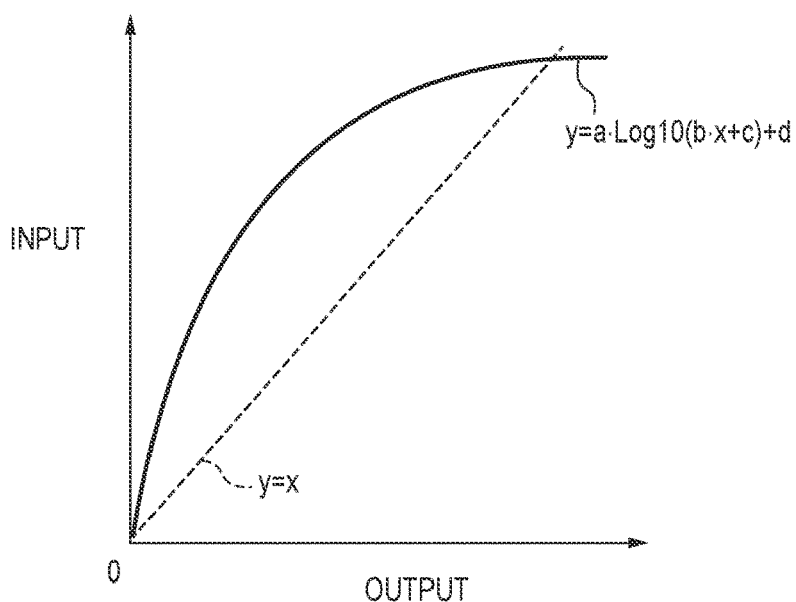
FIG. 4 is a graph showing an example of a non-linear conversion curve.

FIG. 4 is a graph showing a conversion characteristic of non-linear conversion according to this embodiment. y=x without conversion indicated by a broken line is shown for comparison in FIG. 4.

The solid line of FIG. 4 is a non-linear conversion curve according to this embodiment and represents $$y = a \cdot \text{Log}_{10}(b \cdot x + c) + d \tag{1}$$

Here, a, b, c, and d are preset real numbers.

By performing this non-linear conversion, small coefficient data is increased and suppressed from changing to 0 after quantization, and high coefficient data can be coarsely quantized, thereby solving the above-described problem.

Note that since, in some cases, using only the aforementioned equation (1) may result in a negative number or may not be expressible depending on the values of the respective variables "a", "b", "c", and "d", this embodiment further has further defined by $$y = e \cdot x \tag{2}$$

Here, "e" is a preset real number. Although equation (2) is defined as linear conversion, it may be non-linear conversion. In equations (1) and (2), assume that in the possible range of an input wavelet transform coefficient "x", a larger value will be used as an output value "y".

The data determining unit 109 analyzes camera information input from the camera information generating unit 108 and the input RAW image data and performs processing to determine the aforementioned coefficients "a", "b", "c", "d", and "e". A more specific example of this will be described below.

In RAW images, component signals of input images can vary depending on the exposure from the optical source/imaging apparatus and ISO sensitivity even when the object is the same.

Figure 5:
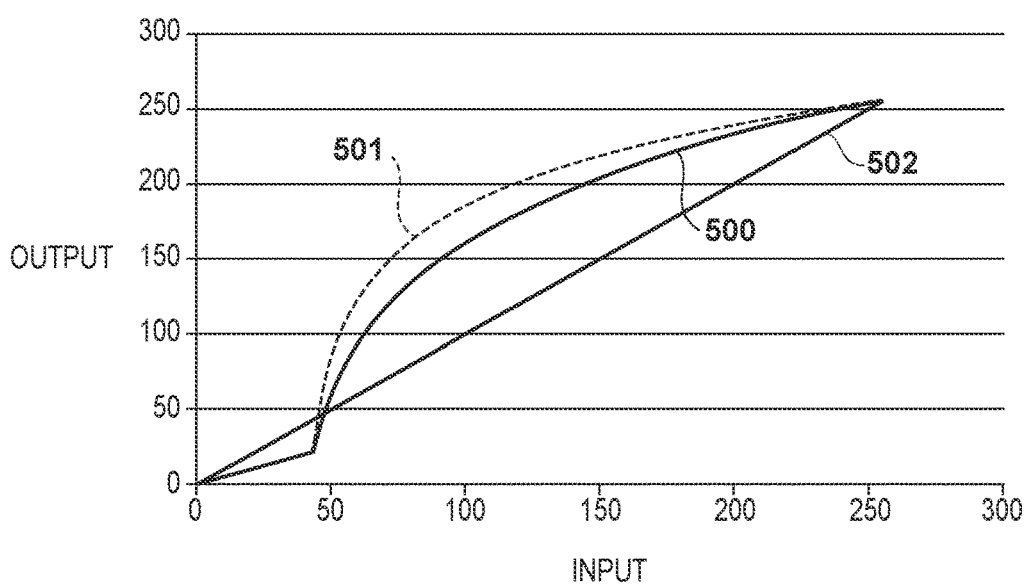
FIG. 5 is a view showing an example of a table of parameters for specifying the non-linear conversion curve.
Figures 6, 7:
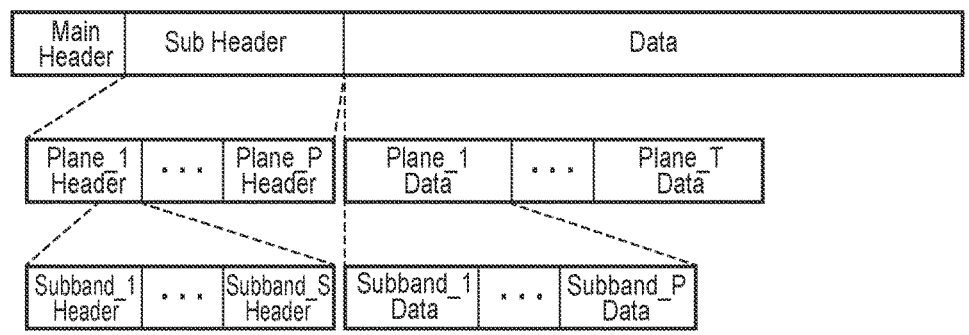
FIG. 6 is a table showing variables at times of optimal exposure and under exposure used in the embodiment.
FIG. 7 is a view showing an example of a file format used in the embodiment.

FIG. 5 is a graph showing the non-linear conversion at the time of optimal exposure and that at the time of under exposure. The abscissa represents the size of coefficient data obtained by wavelet transform, and the ordinate represents the size of the coefficient data after conversion. In FIG. 5, a solid line 500 represents conversion at the time of optimal exposure, and a dotted line 501 represents the conversion at the time of under exposure. As shown in FIG. 5, both non-linear conversion curves of the solid line 500 and the dotted line 501 have an upwardly projecting shape, and the conversion curve at the time of under exposure has a high increase ratio of transform coefficient data compared to that of the conversion curve at the time of optimal exposure. In addition, a solid line 502 represents input=output at the time of non-conversion. FIG. 6 shows an example of variable data "$\underline{a}$", "b", "c", "d", and "e" at the time of optimal exposure and that at the time of under exposure. Assume that FIG. 6 is held in a memory (not shown) as a table.

In general, when the same object has been shot, the contrast will be lower at the time of under exposure compared to that at the time of optimal exposure. As a result, the wavelet coefficient tends to be smaller at the time of under exposure even when the shooting position is the same.

When the same quantizing coefficient is used, the wavelet transform coefficient error after encoding/decoding will be the same. However, in RAW image data, a developing process and image adjustment are performed when the image is to be displayed or converted into a file of another format. When image adjustment is performed, since stronger image correction is performed by performing level correction or the like at the time of under exposure, the compression error is increased before and after compression compared to an image at the time of optimal exposure. Furthermore, since the wavelet transform coefficient is smaller at the time of under exposure, the wavelet transform coefficient is changed to "0", thereby increasing portions where information will be lost even when the same object is shot. Since information of a low amplitude portion, particularly, that of a dark portion and that of flat portion, is frequently lost when the quality of an image degrades after development, image quality degradation can be suppressed by finely quantizing this portion.

In addition, since signal levels are increased in a light portion, there is a tendency for the wavelet transform coefficient to increase overall in a more brightly shot image when the same object is shot. Since in terms of visual characteristic, image quality degradation cannot be visually perceived in a high amplitude portion even if it has been more or less coarsely quantized, the encoding amount can be reduced by coarsely quantizing a location having a large wavelet transform coefficient.

The data determining unit 109 receives a white-balance adjustment value, an exposure correction value, and an ISO sensitivity input from the camera information generating unit 108. When the camera exposure correction value is 0, the exposure can be determined to be optimal since AE will operate. When the exposure correction value is negative, under exposure can be determined. In the case of under exposure, the data determining unit 109 can read the coefficient data "$\underline{a}$", "b", "c", "d", and "e" from the row "under" in the table of FIG. 6 and set the read coefficient data in the data calculating unit 110.

Here, as camera information, exposure correction information, WB setting information, ISO setting information, and the like set as the shooting conditions in the imaging apparatus 100 when shooting RAW image data can be used. Before shooting an image, the user can set these shooting conditions by using the display unit 106 and the operating unit 151. The camera information can be obtained without image data analysis by using, as the camera information, the shooting conditions set by the user before the shooting. Also, in a case in which the imaging apparatus 100 has been set to automatically adjust the shooting conditions, image analysis can be performed before shooting an image to determine the shooting conditions such as the exposure correction information, the WB setting information, and the ISO setting information, and these determined shooting conditions can be used as the camera information. In this case, the camera information can be used without analyzing the image data after shooting.

Furthermore, the present invention is not limited to this. It may be set so that the camera information is obtained by analyzing an image obtained by shooting.

In addition, in the case in which the camera exposure correction value is "0", the data determining unit 109 performs the following processing.

The data determining unit 109 can perform, from the input RAW image data, RGB→YUV conversion and generate luminance image data formed by a luminance Y component. Note that in this conversion, assume that RGB→YUV conversion is performed from the average value of G1 and G2 and the remaining R and B of the 2×2 pixel matrix in the RAW image data. However, a color difference UV need not be calculated since it is sufficient to generate the luminance image data. The data determining unit 109 divides the luminance image data into pixel blocks formed from a preset plurality of pixels and calculates the average luminance value of each pixel block. The data determining unit 109 counts the pixel blocks whose average luminance value is equal to or less than the threshold for dark portion determination. If the count of the pixel blocks whose average luminance value is equal to or less than the threshold for dark portion determination is equal to or more than a preset block count (2 in this embodiment), the data determining unit 109 determines that the image of interest requires correction. The coefficient data $\underline{a}$, b, c, d, and e are read from the row "optimal" in the table of FIG. 6, and the read coefficient data are set in the data calculating unit 110. This is because if there is a predetermined amount or more of dark portion regions in a screen, the possibility that image adjustment will be performed by increasing the dark portion signals after development is performed. Processing to suppress image quality degradation of the dark portion regions will also be performed in such a case as well.

Note that in the case of optimal exposure, when the count of the pixel blocks whose average luminance value is equal to or less than the threshold for dark portion determination does not fulfill the preset block count, it is determined that no correction is to be performed on the wavelet transform coefficient data (this is equivalent to adopting the solid line 502 representing y=x in FIG. 5).

Also, although it is preferable to calculate the average luminance value of each pixel block from the RAW image data of a frame of interest serving as an encoding target, the average luminance value may be obtained from the RAW image data of a frame which is a few frames anterior to the frame of interest and has sufficient temporal proximity. In this case, since a sufficient amount of time can be provided for the above calculation, it is advantageous in reducing the load of the data determining unit 109.

The data determining unit 109 obtains a gain value for image adjustment from the above-described camera information and adjusts, in the above-described manner, the variables "$\underline{a}$", "b", "c", "d", and "e" of equation (1) so the quantization coefficient of the visually perceivable coefficient data will not change to 0 or will be suppressed from changing to 0.

The variables "a", "b", "c", "d", and "e" of equation (1) each have an initial value that serves as a reference, and each value is changed in accordance with the camera information. The variable "a" is used for gain value adjustment. In the case of 8-bit data, it is a value used to make adjustments so that x=255 and y=255. The variable "b" is a value used to change the sensitivity at rise time and is a value that is increased at the time of under exposure. The variable "c" is a value used to change a rise position and is a value determined by the variable "b" and an effective value. The effective value is determined by an optical black value or the like. The variable "d" is an adjustment value determined by the variable "b", is used for decreasing the sensitivity at times other than the rise time, and is a value that is decreased at the time of under exposure. By adopting a non-linear conversion curve as that in FIG. 5 and converting the wavelet transform coefficient data, a visually perceivable wavelet coefficient cannot change to "0" or the gain of a value having a small wavelet coefficient can be increased so as to suppress change.

As already described, the data calculating unit 110 generates four planes, each formed by a single component of pixel data from the RAW image data, and executes discrete wavelet transform on each plane a preset number of times. Then, out of the plurality of subbands generated from each plane, the data calculating unit 110 converts, based on the variables "a", "b", "c", "d", and "e" determined by the data determining unit 109, the coefficient data in each of the subbands Lv1_HL, Lv1_LH, and Lv1_HH including high-frequency components of level 1. As a matter of course, no conversion process of the wavelet transform coefficient is performed when it is determined that conversion is unnecessary (corresponding to y=x of FIG. 5).

The RAW compressing unit 111 performs quantization and entropy encoding on the coefficient data of each subband coefficient output from the data calculating unit 110, generates compression-encoded data, and outputs the generated data to a buffer 112. The RAW compressing unit 111 also generates a header to include information necessary for decompression, stores the generated header in the buffer 112, and creates a write-target file in the buffer 112.

Figure 8:
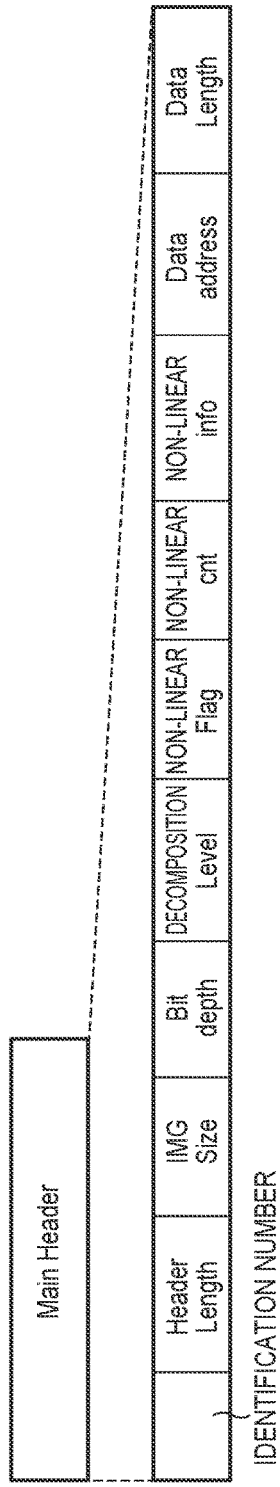
FIG. 8 is a view showing the data structure of a main header portion used in the embodiment.

FIG. 7 shows an example of a file format. As shown in FIG. 7, a file is divided into a header portion and a data portion (payload portion), and the header portion has a main header portion and a sub-header portion. FIG. 8 is the data structure of the main header portion, and an identification number, a header length, an image size, a bit width of the image, a decomposition level of wavelet transform, a non-linear flag indicating whether non-linear conversion is to be performed, a non-linear count which is the non-linear conversion count, non-linear information necessary for non-linear conversion, an address of the data portion, and a data length are described in the data structure.

Figure 9:
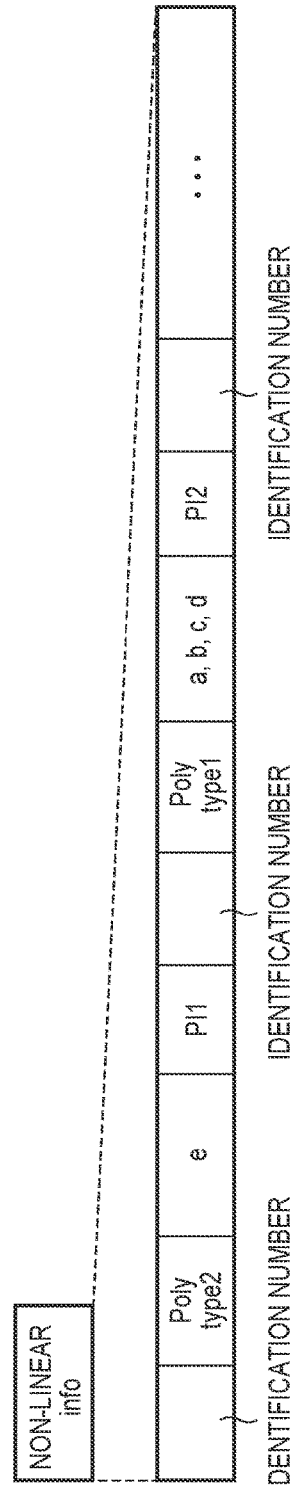
FIG. 9 is a view showing the data structure of non-linear information used in the embodiment.

FIG. 9 shows the data structure of the non-linear information. First, there is an identification number, and then a polynomial type is described. The aforementioned equations (1) and (2) are provided, and Polytype2 has been set as equation (2) in this embodiment. Accordingly, the coefficient e is stored in the next position. The corresponding numerical value shown in the table of FIG. 6 is used as this coefficient. In addition, if the non-linear count of a plane header portion is 2 or higher, the intersection point information is stored as PI. This is described as the input value x and the output value y. Next, equation (1) serving as Polytype1 is selected, and "a", "b", "c", and "d" are stored as coefficients. Subsequently, the non-linear count is input in the same manner again. In the plane header, the address and the length of the data portion are mainly stored for each plane. In the same manner, the address and the length of the data portion are mainly stored for each subband in the subband header.

As described above, the encoding data and the header information of the RAW image data are stored in the buffer 112. Subsequently, the controlling unit 150 performs a process of writing the RAW file in a storage medium 113. The storage medium 113 is a built-in large-capacity memory, a hard disk, a detachable memory card, or the like. It may also be a storage device via a network. The RAW-image encoded data of each frame is written additionally until a stop instruction is issued by the user.

The playback processing according to this embodiment will be described next.

When a playback instruction is input from the user via the operating unit 151, the controlling unit 150 reads out the RAW file designated by the user from the storage medium 113 and stores the file in the buffer 112. A RAW decompressing unit 114 reads out the RAW file stored in the buffer 112 and decompresses, after performing a decoding process, the RAW file which is in a compressed state. The RAW decompressing unit 114 then supplies the data resulting from the decompression to a data inverse converting unit 115.

The data inverse converting unit 115 analyzes the information described in the file header and performs, if the information has been described as non-linear information, a non-linear inverse conversion process based on the variables "a", "b", "c", "d", and "e" that were used at that time. Additionally, the data inverse converting unit 115 performs wavelet inverse transformation on each subband coefficient that has undergone non-linear conversion. As a result, four planes are generated from one frame. The data inverse converting unit 115 merges the obtained four planes, generates the RAW image data of a Bayer array, and supplies the generated RAW image data to the developing unit 104. The developing unit 104 performs the developing process on the RAW image data in the previously described manner. Subsequently, the display processing unit 105 outputs the image data to the display unit 106 or the image output terminal 107 and causes the image to be displayed.

As described above, by performing non-linear conversion on the coefficient data obtained by wavelet transform in accordance with the camera information, the encoding efficiency can be increased and image quality degradation can be suppressed in the developing process.

Figure 14:
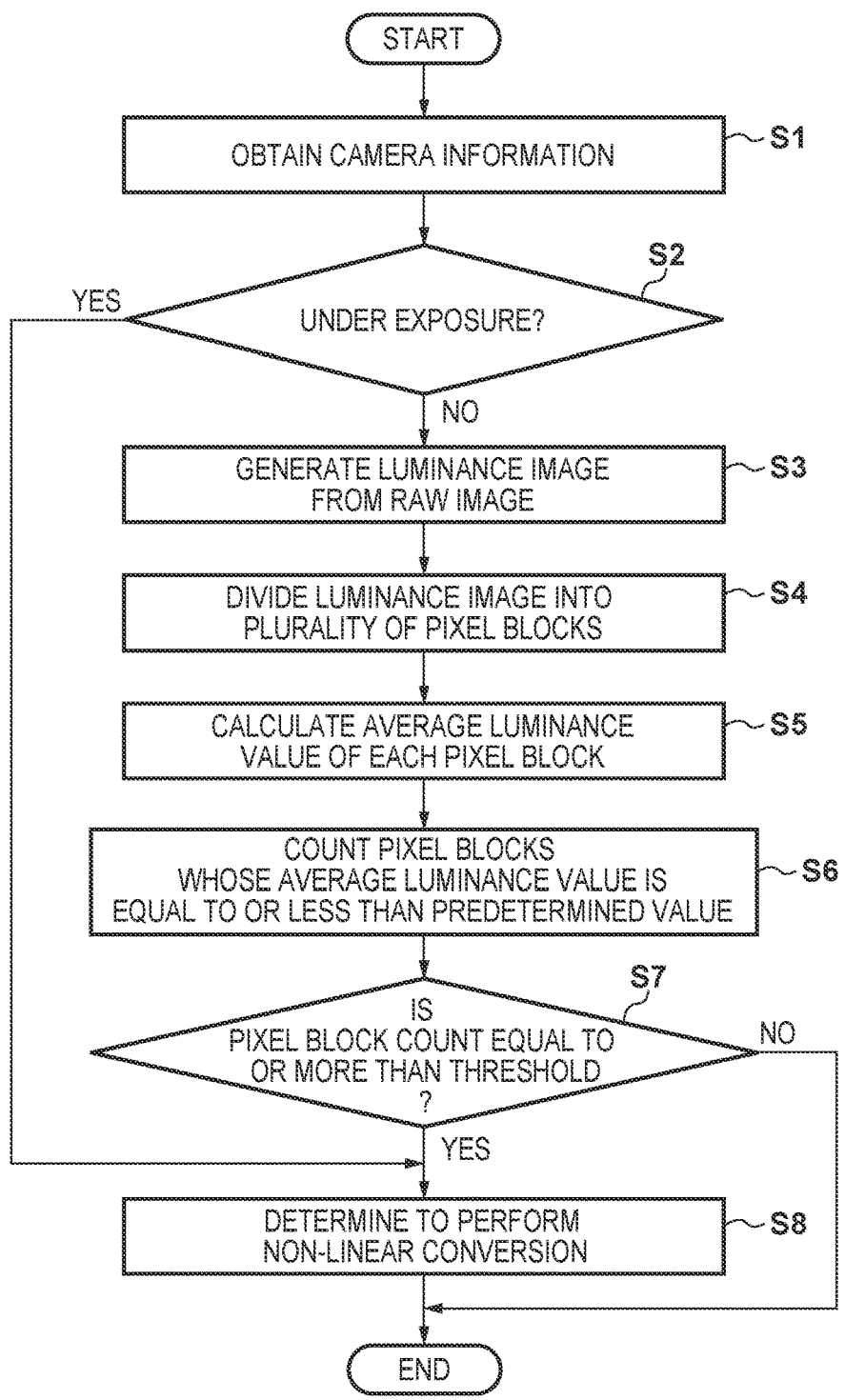
FIG. 14 is a flowchart showing processing contents of a data determining unit according to the first embodiment.

Here, to facilitate further understanding of the processing of the data determining unit 109 according to this embodiment, a description will be given in accordance with the flowchart of FIG. 14. Note that the following description will describe processing performed when one frame is encoded.

First, the data determining unit 109 obtains the camera information from the camera information generating unit 108 (step S1). Then, the data determining unit 109 determines, from the obtained camera information, whether the exposure at the time of imaging of the frame of interest is in a state of under exposure. If it is determined to be in a state of under exposure, the process advances to step S8. In step S8, the data determining unit 109 determines, from the table of FIG. 6, parameters "a", "b", "c", "d", and "e" for performing non-linear conversion belonging to the row "under" and sets the determined parameters in the data calculating unit 110.

On the other hand, if it is determined not to be in a state of under exposure, the data determining unit 109 advances the process to step S3 and generates the luminance image data from the RAW image data. Next, the data determining unit 109 divides the generated luminance image data into a plurality of pixel blocks in step S4 and calculates the average luminance value of each pixel block in step S5. The data determining unit 109 then counts the pixel blocks whose average luminance value is equal to or less than a preset luminance threshold in step S6. Subsequently, in step S7, the data determining unit 109 determines whether the pixel block count is equal to or more than a preset threshold. If it is equal to or more than the threshold, the data determining unit 109 determines, from the table of FIG. 6, the parameters "a", "b", "c", "d", and "e" for performing non-linear conversion belonging to the row "optimal" and sets the determined parameters in the RAW compressing unit 111 in step S8. If the pixel block count is less than the preset threshold (below the threshold), the data determining unit 109 determines not to perform non-linear conversion and sets the data calculating unit 110 so no non-linear conversion is performed.

The processing of the data calculating unit 110 upon acceptance of the setting is performed in the previously described manner.

Note that in the above-described embodiment, although the target of non-linear conversion has been set to the coefficient data of each of the HL, LH, and HH subbands of decomposition level 1, the extent to which decomposition level is to be set as a non-linear conversion target may be determined depending on user operation. In addition, although two types of non-linear conversion curves according to this embodiment have been described as shown in FIG. 5, a plurality of non-linear conversion curves may be defined in accordance with the degree of under exposure, and a single curve may be determined from the plurality of curves based on the camera information.

Furthermore, in the embodiment, the luminance image data was divided into a plurality of pixel blocks, and the average luminance value was obtained to serve as the representative value of each pixel block. Since it is sufficient to be able to determine the magnitude of the luminance on a pixel block basis, the total value of the luminance of the pixel blocks may also be used as the representative value. In the case of the latter, the division calculation for obtaining an average can be omitted, and thus the calculation process can be simplified.

[Second Embodiment]

Figure 10:
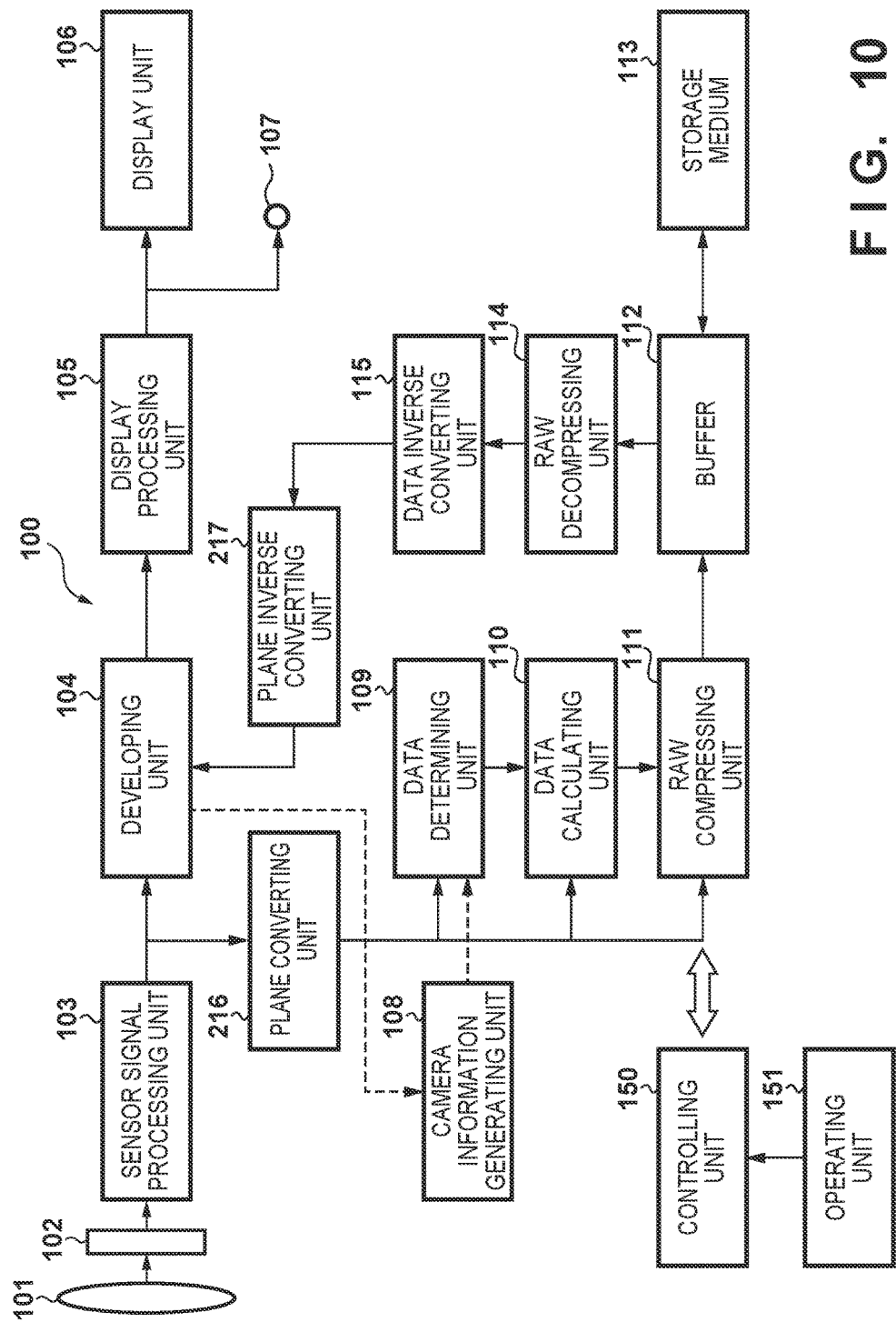
FIG. 10 is a block diagram showing the arrangement of an imaging apparatus according to the second embodiment.

FIG. 10 is a block diagram showing the arrangement of an imaging apparatus according to the second embodiment. The same reference numerals will denote the same components as those used in FIG. 1 of the above-described first embodiment. In addition, since the overall processing is the same as that described above, only parts having different processes will be described below.

A plane converting unit 216 generates, from the RAW image data input from sensor signal processing unit 103, a total of four planes comprised of a Y plane representing luminance and three planes representing color differences C1, C2, and C3. More specifically, the relationship between the aforementioned four planes and the R, B, G1, and G2 planes which are directly separable from the RAW image data can be shown as follows.

$$Y = \frac{(R + B + G1 + G2)}{4}$$

$$C1 = R - G1$$

$$C2 = B - G2$$

-continued $$C3 = \frac{R + G1}{2} - \frac{B + G2}{2}$$

Note that the four planes comprised of one plane representing the luminance Y and three planes representing the color differences C1, C2, and C3 are generated in order to reconstruct the RAW image data of the original Bayer array.

The data calculating unit 110 performs, in the same manner as that in the aforementioned first embodiment, wavelet transform on each plane of the four planes comprised of the luminance plane and the color difference planes that were obtained in the above described manner. However, since the data differs between the luminance plane and the color difference planes, separate conversion adjustments are necessary. In the first embodiment, a common non-linear conversion was performed on the wavelet transform coefficient of each of the R, B, G1, and G2 planes. In contrast, different non-linear processes are performed on the luminance plane and the color difference planes in the second embodiment.

Therefore, the non-linear flag provided in the main header portion of FIG. 8 is turned off, and the non-linear flag of the plane header portion is enabled (turned on).

FIG. 11 shows the data structure of the plane header portion, and an identification number, a header length, a non-linear flag indicating whether non-linear conversion is to be performed, a non-linear count which is the non-linear conversion count, non-linear information necessary for non-linear conversion, an address of the data portion, a data length, a subband count, and a subband header are described in the data structure. The non-linear information is the same as that of the main header portion.

In addition, it is possible to make the non-linear conversion process correspond to each subband in this embodiment. FIG. 12 shows the data structure of the subband head portion. The data structure describes an identification number, a header length, a non-linear flag indicating whether non-linear conversion is to be performed, a non-linear count which is the non-linear conversion count, non-linear information necessary for non-linear conversion, an address of the data portion, and a data length. The non-linear information is the same as that of the main header information.

During playback, as in the same manner as the first embodiment, a data inverse converting unit 115 performs inverse conversion of each plane and supplies the data which has undergone the inverse wavelet transform process to a plane inverse converting unit 217. The plane inverse converting unit 217 forms RAW image data of the Bayer array by converting the four planes comprised of the luminance plane Y and the color difference planes C1, C2, and C3 into each color component plane (one R-component plane, one B-component plane, and two G-component planes) and supplies the formed RAW image data to a developing unit 104. Subsequently, the same operation as that of the first embodiment is performed.

As described above, by non-linearly converting, in accordance with the camera information, each wavelet transform coefficient on a plane basis or a subband basis, it is possible to achieve good encoding efficiency while suppressing image quality degradation in which an image is degraded after a developing process.

[Third Embodiment]

The arrangement of an imaging apparatus according to the third embodiment is the same as that of FIG. 1 in the first embodiment. In the third embodiment, it is possible to perform a non-linear conversion process on each plane or subband without having to perform color conversion processing on each plane. Furthermore, non-linear information can be represented in various ways.

FIG. 13 shows the data structure of non-linear information according to the third embodiment. In the same manner as in FIG. 9, there is an identification number, and then a polynomial type is described. In the same manner as in the first embodiment, "Ploytype2" has been set as equation (2). A coefficient "e" is stored in the next position. In addition, if the non-linear count of a plane header portion is 2 or larger, the intersection point information is stored as "PI". This is described as an input value "x" and an output value "y". Next, after a "Point type" is described, a transformation is formed by linearly linking "PI1" which is the end of equation (2) and coordinates "Xf" and "Yg" which are described in the next position. Additionally, the coordinates "Xf" and "Yg" are linearly linked to "PI2" to form a transformation. Poly Set which is described next represents that there is a predetermined equation, and a number of this equation is described next.

In the third embodiment, it is possible to combine every conversion by linearly linking the linear polynomial and the non-linear polynomial which are predetermined as described above or the linear polynomial and the non-linear polynomial which can be expressed by inputting a coefficient, and the coordinates. Furthermore, in the third embodiment, each intersection PI has been described by two values "x" and "y". However, in a case in which a polynomial is selected, only one of the values need to be recorded since it is possible to derive the intersection from either "x" or "y".

As described above, by converting each wavelet coefficient in accordance with the camera information, it is possible to achieve good encoding efficiency while suppressing image quality degradation in which an image is degraded after a developing process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-147777, filed Jul. 27, 2016, which is hereby incorporated by reference herein in its entirety.

What is claimed is:

1. An imaging apparatus that encodes an image captured by an image sensor, comprising:
at least one processor; and
a memory storing a program to be executed by the at least one processor, the program causes the at least one processor to function as:
a plane converting unit configured to convert RAW image data of a Bayer array obtained by the image sensor into a plurality of planes each comprised of a pixel of a single component;
a frequency transforming unit configured to generate a plurality of subbands by frequency-transforming each of the obtained planes;
a non-linear converting unit configured to, based on camera information related to imaging in the imaging apparatus, non-linearly convert coefficient data forming each of the subbands so as to suppress the loss of coefficient data after quantization for coefficient data indicating a dark portion;
an encoding unit configured to encode by quantizing the coefficient data obtained by the non-linear conversion by the non-linear converting unit,
a storage unit configured to store a first parameter representing a non-linear first conversion curve and a second parameter representing a second conversion curve having a higher increasing ratio than the first conversion curve;
a first determining unit configured to determine, from the camera information, whether RAW image data at the time of imaging is set in a state of under exposure;
a first selecting unit configured to select the second parameter if a state of under exposure is determined by the first determining unit;
a second determining unit configured to determine, if a state of under exposure is not determined by the first determining unit, whether luminance data of the RAW image data satisfies a predetermined condition; and
a second selecting unit configured to select the first parameter if the second determining unit determines that the predetermined condition is satisfied.

2. The apparatus according to claim 1, wherein the camera information is information related to a shooting condition set by a user when the RAW image data is captured.

3. The apparatus according to claim 1, wherein the frequency transforming unit performs wavelet transform.

4. The apparatus according to claim 1, wherein when it is defined that an abscissa indicates the size of a value of the coefficient data and an ordinate indicates the size of the coefficient data obtained by non-linear conversion, the non-linear converting unit performs conversion having a conversion characteristic of an upwardly projecting conversion curve.

5. The apparatus according to claim 1, wherein
the second determining unit generates, if a state of under exposure is not determined by the first determining unit, luminance image data from the RAW image data, divides the luminance image data into a plurality of pixel blocks, calculates a representative value of each of the pixel blocks, counts the pixel blocks having representative values which are not more than a luminance threshold for dark portion determination, and determine whether a pixel block count is not less than a predetermined threshold, wherein the second determining unit selects the first parameter if it is determined that the pixel block count is not less than the predetermined threshold, and determines not to convert the coefficient data when if it is determined that the pixel block count is less than the predetermined threshold.

6. The apparatus according to claim 5, wherein the representative value is one of an average luminance value of pixel blocks and a total luminance value of pixel blocks.

7. The apparatus according to claim 1, wherein the plane converting unit converts the RAW image data into an R plane a B plane, a G1 plane, and a G2 plane based on the Bayer array.

8. The apparatus according to claim 1, wherein the plane converting unit converts the RAW image data into one luminance plane and three color-difference planes.

9. A control method of an imaging apparatus that encodes an image captured by an image sensor, comprising:

converting RAW image data of a Bayer array obtained by the image sensor into a plurality of planes each comprised of a pixel of a single component;

generating a plurality of subbands by frequency-transforming each of the obtained planes;

based on camera information related to imaging in the imaging apparatus, non-linearly converting coefficient data forming each of the subbands so as to suppress the loss of coefficient data after quantization for coefficient data indicating a dark portion;

encoding by quantizing the coefficient data obtained by the non-linear conversions;

storing a first parameter representing a nonlinear first conversion curve and a second parameter representing a second conversion curve having a higher increasing ratio than the first conversion curve;

determining, from the camera information, whether RAW image data at the time of imaging is set in a state of under exposure;

selecting the second parameter if a state of under exposure is determined in the determining;

determining, if a state of under exposure is not determined in the determining, whether luminance data of the RAW image data satisfies a predetermined condition; and selecting the first parameter if it is determined that the predetermined condition is satisfied.

10. A non-transitory computer-readable storage medium storing a program which causes, when read and executed by a computer having an image sensor, the computer to execute steps of a method, the method comprising:

converting RAW image data of a Bayer array obtained by the image sensor into a plurality of planes each comprised of a pixel of a single component;

generating a plurality of subbands by frequency-transforming each of the obtained planes;

based on camera information related to imaging in the imaging apparatus, non-linearly converting coefficient data forming each of the subbands so as to suppress the loss of coefficient data after quantization for coefficient data indicating a dark portion;

encoding by quantizing the coefficient data obtained by the non-linear conversion;

storing a first parameter representing a non-linear first conversion curve and a second parameter representing a second conversion curve having a higher increasing ratio than the first conversion curve;

determining, from the camera information, whether RAW image data at the time of imaging is set in a state of under exposure;

selecting the second parameter if a state of under exposure is determined in the determining;

determining, if a state of under exposure is not determined in the determining, whether luminance data of the RAW image data satisfies a predetermined condition; and selecting the first parameter if it is determined that the predetermined condition is satisfied.

* * * * *